United States Patent [19]

McClellan

[11] 4,132,381
[45] Jan. 2, 1979

[54] RELEASABLE CLAMP FOR ELONGATED OBJECTS SUCH AS FISHING RODS

[75] Inventor: Bingham A. McClellan, Traverse City, Mich.

[73] Assignee: McClellan Industries, Inc., Traverse City, Mich.

[21] Appl. No.: 839,773

[22] Filed: Oct. 6, 1977

[51] Int. Cl.² ............................................. A47F 5/00
[52] U.S. Cl. ............................ 248/316 R; 248/74 PB; 24/16 PB; 248/305; 211/60 R
[58] Field of Search .................. 248/316 R, 251, 305, 248/74 A, 74 B, 74 PB, 74 R; 211/60 R, 60 SK, 60 T; 24/16 PB, 237

[56] References Cited

U.S. PATENT DOCUMENTS

| | | | |
|---|---|---|---|
| 2,453,319 | 11/1948 | Hollyday | 248/74 B |
| 3,460,787 | 8/1969 | Petze | 248/74 PB |
| 3,561,037 | 2/1971 | Hachtel | 24/237 |
| 3,597,803 | 8/1971 | Van Neil | 24/16 PB |
| 3,712,655 | 1/1973 | Fuehrer | 24/16 PB |
| 3,721,750 | 3/1973 | Countryman | 24/16 PB |
| 3,954,238 | 5/1976 | Nivet | 248/74 PB |

*Primary Examiner*—Robert A. Hafer
*Attorney, Agent, or Firm*—Austin A. Webb

[57] ABSTRACT

A clamp of molded thermo-plastic material in soft and semi-flexible but self supporting condition has a thin rectangular back strip attachable to a supporting surface and bendable to conform to curved surfaces. A rod support arm projects from the intermediate portion of the back strip with upwardly inclined and vertically spaced upper and lower bars. The ends of the bars are connected by an outwardly and upwardly concave hook having serrations on its face. An integral web connects the bars, hook and back strip. The outer end of the hook has spaced downwardly facing transverse notches in its lower side. An integral strap projects from the back strip above the upper bar, and divides into divergent fingers with a cross piece on their outer ends. The strap and fingers are tensioned when engaged over the end of the hook.

4 Claims, 5 Drawing Figures

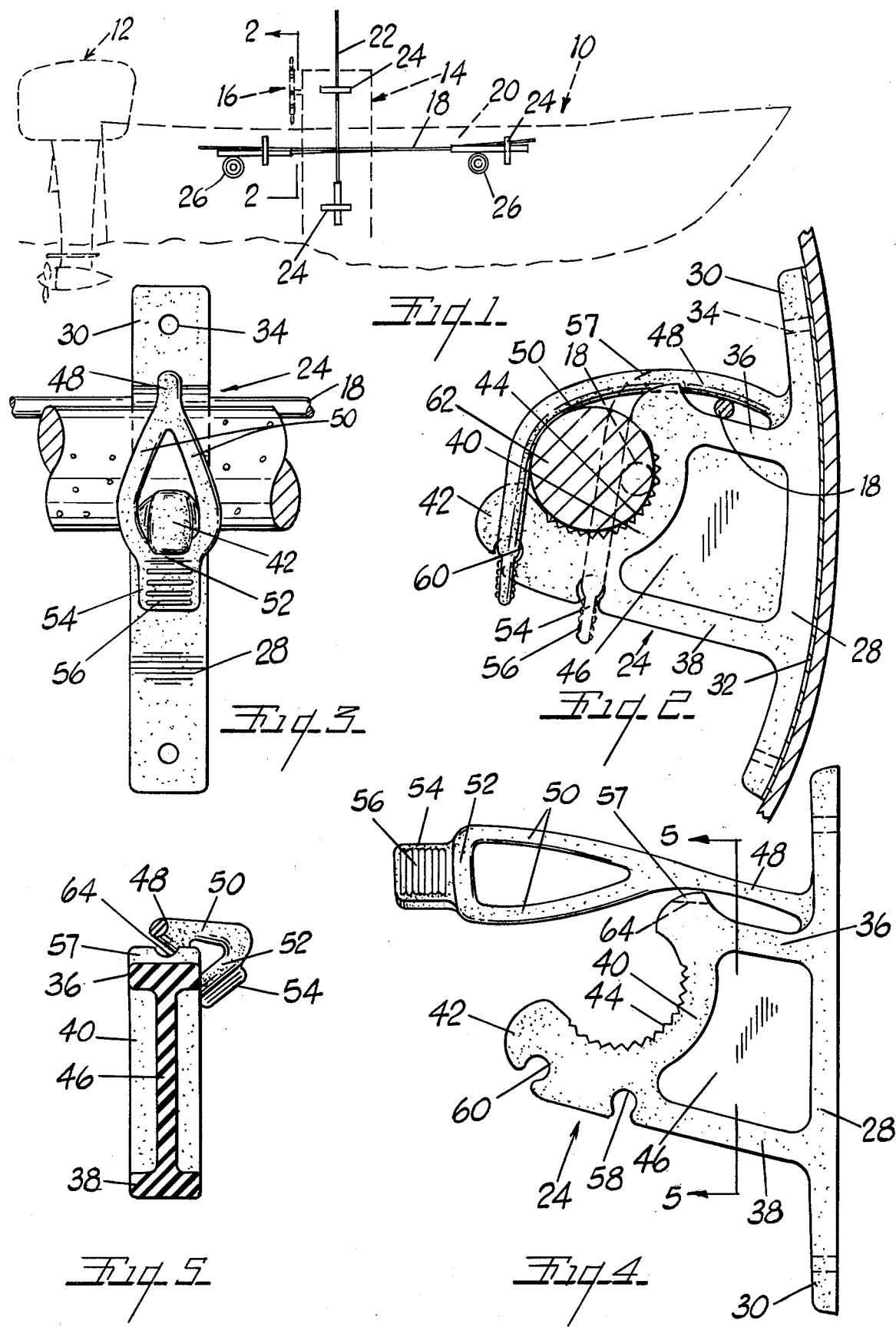

RELEASABLE CLAMP FOR ELONGATED OBJECTS SUCH AS FISHING RODS

OUTLINE OF INVENTION

The purpose of the present invention is to provide a clamp which may be used in pairs for storing or holding fishing rods in a boat when the rods are not in use. To this end, the clamp has a flexible base to conform to flat or curved surfaces of various models of fishing boats. The clamp is also flexible in its rod receiving portions to prevent injury to passengers of the boat by bumping into the clamps while the clamps are empty or when holding a fishing rod. The flexibility of the clamp, together with its shape permit it to support and retain various portions of rods of different sizes. A flexible support arm has a concave seat for supporting rods, and a strap which is stretchable over rods or rod portions of different sizes to engage in notches provided on the underside of the arm. Novelty is believed to lie in the flexibility of the clamp and the selective coaction between the stretchable strap and the rod supporting arm.

DESCRIPTION

The drawings, of which there is one sheet illustrate a preferred embodiment of the clamp of the invention and two different manners or positions of use.

FIG. 1 is a side elevational view showing a fishing boat in phantom lines with fishing poles mounted in carrying positions by clamps of the invention.

FIG. 2 is a fragmentary cross sectional view taken along the plane of the line 2—2 in FIG. 1 and looking in the direction of the arrows.

FIG. 3 is a front or edge view of the clamp shown in FIG. 2.

FIG. 4 is a side elevational view of the clamp in FIGS. 2 and 3 in the free unmounted position of the clamp.

FIG. 5 is a cross sectional view taken along the plane of the line 5—5 in FIG. 4 and looking in the direction of the arrows.

FIG. 1 conventionally shows a fishing boat 10 in phantom or dotted lines. The boat has an outboard motor 12 mounted on its stern and an upright center control column or housing 14 with a wheel 16 and other controls (not shown) mounted amid-ships. Two fishing rods 18 are removably stored along the thwart 20 of the boat; and another rod 22 is mounted in upright position alongside of the column 14. The rods are each secured in place by two clamps 24 of the invention. The rods may be fully rigged with reels 26 and ready for use. At the same time, the rods are secured in positions which do not interfere with movement of passengers within the boat. Other locations for storing the rods are possible, as on the underside of a cover of a bench type locker (not illustrated) located along one thwart of the boat.

As is more particularly illustrated in FIGS. 2–4, each clamp 24 consists of a unitary body molded of a thermoplastic or rubber material, and is of self sustaining but flexible consistancy. The body has an elongated, generally rectangular, back or base 28 which is somewhat thinner than its width, so that its ends 30 are flexible to conform to curved shapes of the boat thwart 20 where desired. The base is secured to the thwart or other part of the boat by a coating or layer 32 of adhesive as shown in FIG. 2. The ends of the base may have holes 34 therethrough for holding the clamp, in place of the adhesive, or in addition to the adhesive.

Projecting laterally from the base intermediate of its ends are spaced parallel upper and lower arms 36 and 38 respectively. Upper arm 36 is somewhat shorter than lower arm 38. The arms are connected by an upwardly and outwardly concave hook 40 with a nose or front end 42 on its front end. The arms 36 and 38 and the hook 40 are approximately the same transverse width as the base, but the nose 42 tapers outwardly from the rest of the hook. The upwardly facing surface of the hook is serrated by radially projecting flexible teeth 44. An integral web 46 connects the base 28, arms 36 and 38 and the hook 40, and may be continuous as shown, or may be apertured near its center.

Projecting outwardly from the base 28 and just above the upper arm 36 is a strap 48 of circular cross section and less cross sectional area than the arms. The end of the strap connects to divergent branches or fingers 50 with a connecting crosspiece 52 at their outer ends. A flat finger piece or grip 54 having serrated surfaces 56 is connected to the cross piece 52. As appears most clearly in FIGS. 4 and 5, the strap 48 and fingers 50 are molded with a twist relative to the base 28 and arms 36 and 38, so that in the unstressed condition of the strap it projects somewhat laterally with the fingers 50 and finger piece or grip 54 above and to one side of the serrated face 44 of the hook. The integrally molded strap as shown is preferred, but a separate strap secured to the base would perform much the same holding action.

The outer end of the upper arm 36 carries a raised transverse rib 57 opposed to the strap 48. The underside of the lower arm 38 defines a transverse inner groove 58 with a reentrant or restricted throat. A second transverse groove 60 with reentrant throat is formed further outwardly on the underside of the nose 42. The grooves 58 and 60 are slightly smaller than the cross piece 52 of the strap so as to springably grip the cross piece when the strap is engaged therein. The distance of the notch 58 from the end of the upper arm 36 is slightly greater than the at rest length of strap 48 and fingers 50 so that the latter must be stretched slightly in engaging the notch. In the engaged position of the strap, the fingers bridge the open side of the hook and springably engage the butt 62 of one rod. When two rods are stored as shown, the tip or smaller end of the other rod is held against the top of the upper arm 36. When only one rod is held in the clamps the small end may be held against the back of the hook with the cross piece engaged in the notch 58 as shown in dotted lines in FIG. 2. Desirably the rib 57 is notched in the center as at 64 to center the strap 48 when in use.

Throughout this description the terms upper and lower, inner and outer, and front and back have been used to describe the parts of the clamp with reference to the side mounting on the inside of the thwart of a boat and it should be understood that these terms are relative and not limiting when applied to other mountings of the clamp. It is especially noted that the clamp may be mounted in pairs on either the interior or exterior surface of any vehicle for carrying elongated objects.

What is claimed to be new and what is desired to be secured by Letters Patent is defined in the following claims:

1. A rod holding clamp having a flat base adapted to be secured to a supporting surface, said clamp comprising:

upper and lower arms projecting outwardly from said base in spaced relation to each other and to the ends of the base, an upwardly and outwardly concave hook having transverse serrations on its face and connecting the outer ends of said arms with a web connecting the opposed interior surfaces of said base, said arms, and said hook, said base, said arms, said hook and said web being integrally molded of bendable but self supporting material, and a strap of less cross sectional area than said base (connected) molded integrally at one end to said base above said arms and having divergent fingers of circular cross section at its outer end connected by a cross piece with a finger grip on the opposite side of the cross piece from said fingers, the outer end of said hook having a tapering nose adapted to penetrate between said fingers, the bottom of said hook below said nose defining two downwardly opening notches adapted to retainingly receive said cross piece on said strap, the length of said strap and said fingers being such that the strap and fingers must be stretched to move said cross piece over the nose on said hook and into said notches, the interior length of said cross piece being less than the width of the lower portion of said hook in its unstressed condition whereby said fingers on said strap are stretched apart in moving said cross piece over said nose and into said notches.

2. A rod holding clamp as defined in claim 1 in which said upper and lower arms are inclined upwardly from said base.

3. A rod holding clamp as defined in claim 1 in which said upper and lower arms are inclined upwardly from said base.

4. A rod holding clamp as defined in claim 3 in which said strap and the fingers thereon are twisted in their free position as molded out of a plane through the centers of said arms, whereby said strap is torsionally tensioned when said cross piece is engaged in either of said notches.

* * * * *